(12) United States Patent
Dhulipala et al.

(10) Patent No.: US 10,934,471 B2
(45) Date of Patent: *Mar. 2, 2021

(54) DECREASING FOULANT DEPOSITION ON AT LEAST ONE SURFACE BY CONTACTING THE SURFACE(S) WITH AT LEAST ONE PROTEIN

(71) Applicant: Baker Hughes, a GE company, LLC, Houston, TX (US)

(72) Inventors: Prasad D. Dhulipala, Katy, TX (US); Charles David Armstrong, Tomball, TX (US)

(73) Assignee: Baker Hughes Holdings LLC, Houston, TX (US)

( * ) Notice: Subject to any disclaimer, the term of this patent is extended or adjusted under 35 U.S.C. 154(b) by 123 days.

This patent is subject to a terminal disclaimer.

(21) Appl. No.: 16/233,930

(22) Filed: Dec. 27, 2018

(65) Prior Publication Data

US 2019/0119555 A1 Apr. 25, 2019

Related U.S. Application Data

(62) Division of application No. 15/266,436, filed on Sep. 15, 2016, now Pat. No. 10,196,554.

(Continued)

(51) Int. Cl.
*C09K 8/52* (2006.01)
*C09K 8/035* (2006.01)
(Continued)

(52) U.S. Cl.
CPC ............... *C09K 8/52* (2013.01); *C09K 8/035* (2013.01); *C09K 8/528* (2013.01); *C10G 75/04* (2013.01); *C09K 2208/32* (2013.01)

(58) Field of Classification Search
CPC ...... C09K 2208/32; C09K 8/035; C09K 8/52; C09K 8/528; C10G 75/04
See application file for complete search history.

(56) References Cited

U.S. PATENT DOCUMENTS

| 8,822,390 B2 | 9/2014 | Heath et al. |
| 2012/0055670 A1 | 3/2012 | Armstrong |
| 2015/0291871 A1 | 10/2015 | Armstrong et al. |

FOREIGN PATENT DOCUMENTS

| CN | 102146161 A | 8/2011 |
| EP | 2537909 A2 | 12/2012 |
| EP | 2796527 A1 | 10/2014 |

OTHER PUBLICATIONS

Magin, C.M. et al., "Non-toxic Antifouling Strategies," Materials Today, vol. 13, No. 4, pp. 36-44 (2010).

(Continued)

*Primary Examiner* — Frances Tischler
(74) *Attorney, Agent, or Firm* — Mossman, Kumar & Tyler, PC

(57) ABSTRACT

Corrosion and/or calcium scale deposition on a surface in contact with corrosion forming components and/or scale forming components within a subterranean formation may be decreased, prevented, and/or inhibited by contacting the surface with at least one protein. The protein(s) may be or include, but is not limited to, at least one aspein protein, at least one aspolin protein, at least one dentine protein, at least one DRICH-1 protein, at least one nacrein protein, at least one SMDT-1 protein, derivatives thereof, fragments thereof, mimetics thereof, and combinations thereof. The surface may be or include, but is not limited to a metal surface, a plastic surface, a ceramic surface, a painted surface, a coated surface, and combinations thereof.

18 Claims, 2 Drawing Sheets

Specification includes a Sequence Listing.

MKGIAILMCLAALVAVSVTFPVADQTTNELGSSGAAAAGAVVSEPSDAGDAAD
AGDADAADADAADADADADADADNDDGDDDDDDDDDSGDDDSGDDDDSG
DDDDSGDDDDSGDDDDSGDDDDSGDDDGDDDSEDDDDSGDDDSGDGDDGDS
GDDDDDDSGDDDDDDSGDDDDSGDDDDGDSGDDDSGDDDGDDDDSGDD
DSGDDDDSGDDDSGDDDDSGDDDSGDDESGDDDSGDDDDSGDDDSGDDDSGD
DGDDDDSGDDDDSGDDDDSGDDDDDDDSGDDDDGDSGDDDSGDDDGDDDD
SGDDDSGDDESGDDDSEDDDSGDDDSGDDDSGDDDSDSGDDDSGDDDSGDDD
SGDDDGDDGDDDADSGDDDDDDDDDDGDDGDDDSGDDDGDDSDDDDDDDD
DDQ

Related U.S. Application Data

(60) Provisional application No. 62/237,808, filed on Oct. 6, 2015.

(51) Int. Cl.
*C09K 8/528* (2006.01)
*C10G 75/04* (2006.01)

(56) References Cited

OTHER PUBLICATIONS

Int'l Search Report & Witten Opinion in PCT/US2016/052175, dated Dec. 27, 2016.

MKGIAILMCLAALVAVSVTFPVADQTTNELGSSGAAAAGAVVSEPSDAGDAAD
AGDADAADADAADADADADADNDDGDDDDDDDDDSGDDDSGDDDDSG
DDDDSGDDDDSGDDDDSGDDDDSGDDDGDDDSEDDDDSGDDDSGDGDDGDS
GDDDDDDSGDDDDDDSGDDDDDSGDDDDGDSGDDDSGDDDGDDDDSGDD
DSGDDDDSGDDDSGDDDDSGDDDSGDDESGDDDSGDDDDSGDDDSGDDDSGD
DGDDDDSGDDDDSGDDDDSGDDDDDDDSGDDDDGDSGDDDSGDDDGDDDD
SGDDDSGDDESGDDDSEDDDSGDDDSGDDDSGDDDSDSGDDDSGDDDSGDDD
SGDDDGDDGDDDADSGDDDDDDDDDDGDDGDDDSGDDDGDDSDDDDDDDD
DDQ

FIG. 1

MASYKTWLLGLLVALLCSFQTPLAPGVKAQDLPFVQEEGLVADDDDDDDDDAG
DDDDDDDDDDDDDDDDDDDDDDDDDEDDDDDDDDDDDDDDDDDDDDDD
DDDDDDDDDDDDDDDDDDDDDDDDDDDDDDDDDDDDDDDDDDDDDDDD
DDDDDDDDDDDDDDDDDDDDDDDDDDDDDDDDDDDDDDDDDDDDDDDD
DDDDDDDDDDDDDDDDDDDDHEEL

FIG. 2

MASYKTWLLGLLVALLCSFQTPLAPGVKAQDLPFVQEEGLVADDDDDDDDDAG
DDDDDDDDDDDDDDDDDDDDDDDDDEDDDDDDDDDDDDDDDDDDDDDD
DDDDDDDDDDDDDDDDDDDDDDDDDDDDDDDDDDDDDDDDDDDDDDDD
DDDDDDDDDDDDDDDDDDDDDDDDDDDDDDDDDDDDDDDDDDDDDDDD
DDDDDDDDDDDDDDDDDDDDHEAGDDDDDDDDDDDDDDDDDDDDDDD
DDDDDDDDDDDDDDDSTYHKGSVCAYCEFCEHCDGCDKCPCEEGDTSEHCD
DCKMCNFCHVCPMCKTLCTPGGFLDEFTGSIYKTVADVFDDEKK

DECREASING FOULANT DEPOSITION ON AT LEAST ONE SURFACE BY CONTACTING THE SURFACE(S) WITH AT LEAST ONE PROTEIN

CROSS-REFERENCE TO RELATED APPLICATION

This application is a divisional application of U.S. Ser. No. 15/266,436 filed Sep. 15, 2016, issued as U.S. Pat. No. 10,196,554 on Feb. 5, 2019, that in turn claims the benefit of Provisional Patent Application No. 62/237,808 filed Oct. 6, 2015, both of which are incorporated by reference herein in their entireties.

TECHNICAL FIELD

The present invention relates to decreasing foulant formation and/or foulant deposition on at least one surface by contacting the surface(s) with at least one protein, such as but not limited to at least one aspein protein, at least one aspolin protein, at least one dentine protein, at least one DRICH-1 protein, at least one nacrein protein, at least one SMDT-1 protein, derivatives thereof, fragments thereof, mimetics thereof, and combinations thereof.

BACKGROUND

The problems of foulant formation and/or foulant deposition have troubled downhole operations for years. Foulants accumulate on internal walls of various water systems, pipe surfaces, wellbore surfaces, etc. and thereby materially lessen the operational efficiency of a downhole operation.

Much of the foulant formation and/or foulant deposition occurs as a result of various components added to a fluid for various reasons, such as the salt for brine-based fluids, corrosion inhibition, bridging agents, scale inhibitors, and the like. The foulants may be or include scale, corrosion, and combinations thereof. The various corrosion forming components may cause corrosion to a downhole surface. The various scale forming components may precipitate from the fluid as scale, and it is this formed scale that may deposit onto a surface, which may occur at each instance of scale formation.

For example, corrosion may occur and/or scale may form because a brine-based fluid or system becomes saturated with a material due to a change in the flowing fluid conditions within the subterranean formation. Formation of corrosion and/or scale may occur when mixing insoluble waters, out-gassing, shear, turbulence, temperature and/or pressure changes, and combinations thereof; from pressure drops, water mixing points, outgassing points, shear points, gravel packs, and the like.

Chemical corrosion inhibitors decrease the amount and/or rate of corrosion formation and thereby decrease the amount of corrosion to a downhole surface. Chemical scale inhibitors decrease the amount and/or rate of scale formation in and around the surfaces within a subterranean formation, such as a subterranean reservoir wellbore.

Traditional inhibitors, such as ion exchange resins, polyacrylic acids, and the like are used as anti-foulants against scale and/or corrosion forming components. But such anti-foulants are extremely toxic, and other traditional inhibitors for decreasing corrosion and/or scale have not been satisfactory in an environment having a high amount of scale forming components, corrosion forming components, and/or a high amount of total dissolved solids.

For this reason, polyaspartic acid has been used for decreasing scale and/or corrosion on surfaces within a subterranean reservoir wellbore and/or surface in a refinery (e.g. an oil/gas refinery). However, polyaspartic acid is difficult to manufacture in large quantities. In addition, polyaspartic acid contains 50% alpha structures and 50% beta structures, but only the alpha structures are effective in decreasing formation and/or deposition of scale forming components and/or corrosion forming components onto a surface.

Thus, it would be desirable to determine other useful proteins for decreasing foulant formation and/or foulant deposition, but where the proteins are easily reproducible on a large scale.

SUMMARY

There is provided, in one form, an additive composition for a base fluid, such as but not limited to, a drilling fluid, a completion fluid, a production fluid, a servicing fluid, an injection fluid, a refinery fluid, and combinations thereof. The additive composition may include at least one protein, such as but not limited to, at least one aspein protein, at least one aspolin protein, at least one dentine protein, at least one DRICH-1 protein, at least one nacrein protein, at least one SMDT-1 protein, derivatives thereof, fragments thereof, mimetics thereof, and combinations thereof.

There is further provided in another non-limiting embodiment, a fluid composition including a base fluid, at least one protein, and at least one foulant forming component where less foulant formation occurs in the presence of the at least one protein as compared to an otherwise identical fluid composition absent the at least one protein. The base fluid may be or include, but is not limited to, aqueous-based fluids, non-aqueous-based fluids, emulsified fluids, non-emulsified fluids, and combinations thereof. The protein(s) may be or include, but is not limited to at least one aspein protein, at least one aspolin protein, at least one dentine protein, at least one DRICH-1 protein, at least one nacrein protein, an SMDT-1 protein, derivatives thereof, fragments thereof, mimetics thereof, and combinations thereof.

In another non-limiting embodiment, a method may include contacting at least one surface with at least one protein, and decreasing an amount of foulant deposition onto the surface as compared to an otherwise identical surface absent the contact of the surface with the at least one protein. The protein(s) may be or include, but are not limited to, at least one aspein protein, at least one aspolin protein, at least one dentine protein, at least one DRICH-1 protein, at least one nacrein protein, at least one SMDT-1 protein, derivatives thereof, fragments thereof, mimetics thereof, and combinations thereof.

BRIEF DESCRIPTION OF THE DRAWINGS

In order to more fully understand the drawings referred to in the detailed description, a brief description of each drawing is presented here:

FIG. 1 (SEQ ID NO:1) represents the amino acid sequence of an aspein protein;

FIG. 2 (SEQ ID NO:2) represents the amino acid sequence of an aspolin 1 protein;

FIG. 3 (SEQ ID NO:3) represents the amino acid sequence of an aspolin 2 protein.

DETAILED DESCRIPTION

Figure 4:
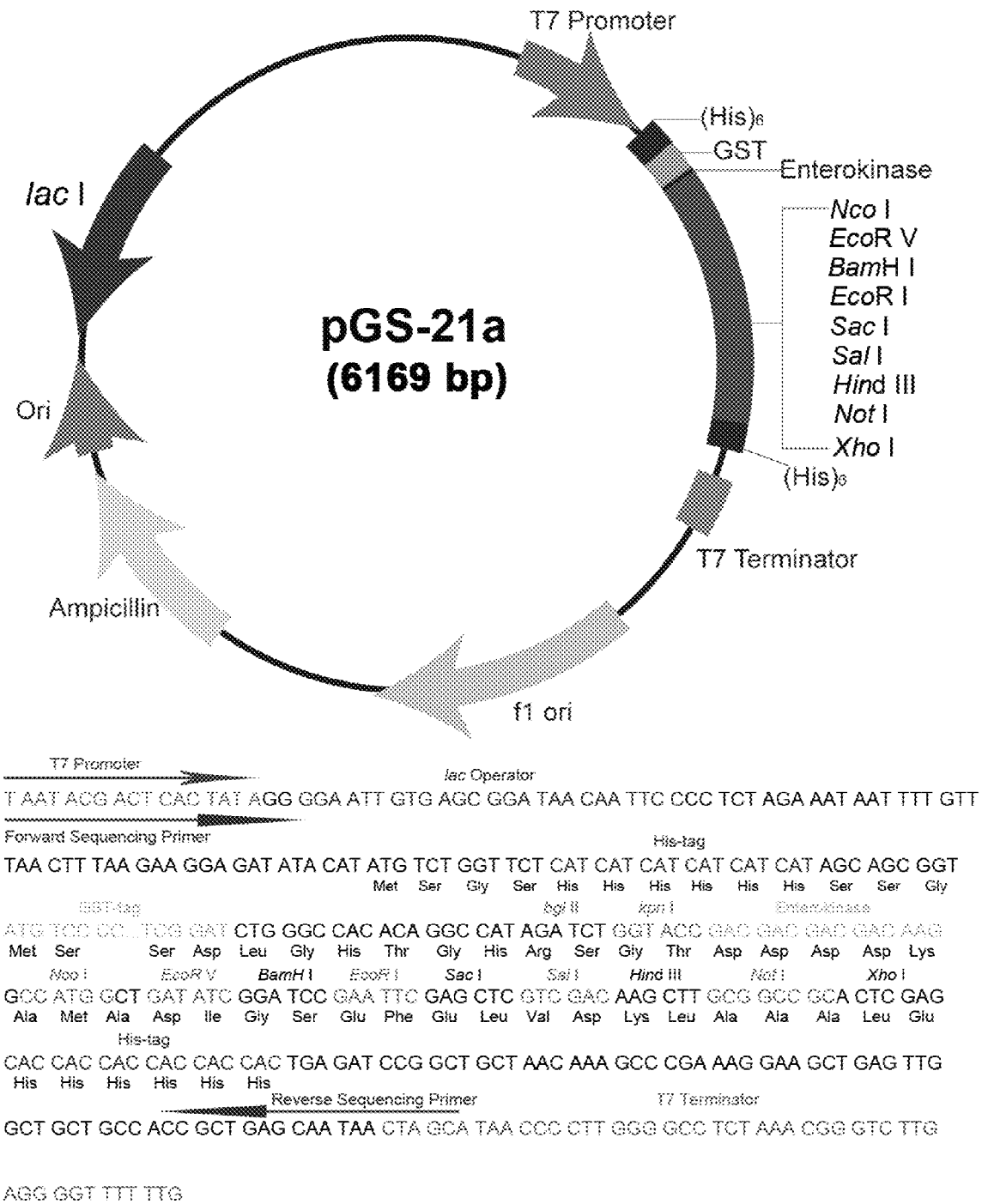
FIG. 4 represents a pGS21 plasmid for use as an expression vector for at least one recombinant protein(s).

It has been discovered that an additive composition may help to decrease foulant formation within a base fluid and/or decrease foulant deposition on at least one surface as compared to an otherwise identical base fluid and/or surface absent the contact with the additive composition and/or fluid composition. The additive composition may include at least one protein having an amino acid sequence of at least 60% aspartic acid, such as but not limited to, at least one aspein protein, at least one aspolin protein, at least one dentine protein, at least one DRICH-1 protein (also known as an aspartate rich protein), at least one nacrein protein, at least one SMDT-1 protein (also known as a single pass membrane protein with an aspartate rich tail), derivatives thereof, fragments thereof, mimetics thereof, and combinations thereof.

The protein(s) may be less toxic to the environment, as compared to conventional non-biodegradable anti-foulants used for the same purpose, and the protein(s) may be made from renewable resources. The use of the protein(s) in a base fluid may provide a renewable alternative to conventional additives (non-biodegradable) that are used to decrease foulant deposition to a surface and/or foulant formation within a base fluid. In addition, the protein(s) may have an amino acid sequence comprising where a majority of the amino acid sequence is aspartic acid.

In a non-limiting embodiment, the aspein protein may be or include an aspein protein having an amino acid sequence at least 75% homologous to the amino acid sequence of SEQ ID NO:1. In a non-limiting embodiment, the aspolin protein may be or include an aspolin protein I having an amino acid sequence at least 75% homologous to the amino acid sequence of SEQ ID NO:2. In a non-limiting embodiment, the aspolin protein may be or include an aspolin protein II having an amino acid sequence at least 75% homologous to the amino acid sequence of SEQ ID NO:3.

'Derived from' with respect to the protein(s) is meant to include whole proteins or protein fragments, and/or where the protein originated from a particular species and was isolated from that particular species; 'derived from' also encompasses polypeptides identical in amino acid sequence to the active site of the particular protein that is recombinantly expressed in a host cell expression system or chemically synthesized. 'Recombinant DNA' is DNA that has been formed artificially by combining constituents from different organisms, such as inserting the gene sequence into an *E. coli* host cell for expression of the target protein in a non-limiting example.

For example, the aspein protein having the amino acid sequence of FIG. 1 (SEQ ID NO:1) may be derived from *Pinctada fucata*, a type of pearl oyster or recombinant protein is expressed from the cDNA encoding the protein. The aspolin protein(s) having the amino acid sequence of FIG. 2 (SEQ ID NO:2) and/or FIG. 3 (SEQ ID NO:3) may be derived from a WallEye Pollack, a type of fish or recombinant protein is expressed from the cDNA encoding the protein.

'Derived from' also includes derivatives of the proteins, such as a polypeptide or fragment that may be substantially similar in primary structural sequence to the protein(s) described herein, but which may include chemical and/or biochemical modifications that are not found in the native polypeptide. Such chemical and/or biochemical modifications are discussed in more detail below.

The primary structural sequence is the sequence of amino acids linked together to form the primary structure of for the protein(s). The secondary structure of the protein refers to the pairing interactions between the amino acids within a single protein or set of interacting molecules therein, such as a beta-helix in the protein. Tertiary structure refers to the three-dimensional structure of the protein formed from the amino acid sequence. Quaternary structure refers to the interaction between at least two tertiary structures.

'Fragment' as used herein is meant to include any amino acid sequence shorter than the full-length protein(s), but where the fragment maintains similar activity to the full-length protein(s). Fragments may include a single contiguous sequence identical to a portion of the protein sequence. Alternatively, the fragment may have or include several different shorter segments where each segment is identical in amino acid sequence to a different portion of the amino acid sequence of the protein(s), but linked via amino acids differing in sequence from the protein(s). 'Mimetic' as used herein may include polypeptides, which may be recombinant, and peptidomimetics, as well as small organic molecules, which exhibit similar or enhanced activity as compared to the protein(s) described herein.

The translated amino acid sequence for at least one protein may be substantially homologous to the amino acid sequence of FIG. 1 (SEQ ID NO:1), FIG. 2 (SEQ ID NO:2), or FIG. 3 (SEQ ID NO:3) in a non-limiting embodiment. The term "substantially homologous" is used herein to denote an amino acid sequence having at least 75% sequence identity to the sequences shown in FIG. 1 (SEQ ID NO:1), FIG. 2 (SEQ ID NO:2), or FIG. 3 (SEQ ID NO:3), alternatively from about 80% independently to about 99.5%, or from about 85% independently to about 95%. As used herein with respect to a range, "independently" means that any threshold may be used together with another threshold to give a suitable alternative range, e.g. about 75% independently to about 85% is also considered a suitable alternative range.

In a non-limiting embodiment, the non-limiting isolated protein(s) is substantially free of other proteins. The non-limiting protein(s) may be in a form that is at least 40% pure, alternatively from about 60% pure independently to about 99.5% pure, or from about 75% pure independently to about 90% pure as determined by SDS-PAGE.

In another non-limiting embodiment, the protein(s) may have at least one glycosylation site. The glycosylation site(s) may aid the protein(s) in decreasing/preventing/inhibiting foulant formation and/or foulant deposition. The glycosylation sites may be present in the primary structure of the protein. Glycosylation between a carbohydrate, i.e. a glycosyl donor, is attached to a hydroxyl or other functional group of another molecule, i.e. a glycosyl acceptor. Glycosylation refers to an enzymatic process where glycans may attach to proteins, lipids, or other organic molecules. Glycosylation is a form of co-translational and post-translational modification.

'Deposited' as used herein means that the foulant forming components at least partially form a layer onto the surface either by absorbing and/or adsorbing to the surface. In a non-limiting instance, the foulant forming components absorb onto the surface and do not adsorb onto the surface; alternatively, the substance adsorbs onto the surface but does not absorb. The surface(s) may be or include, but are not limited to, a metal surface, a plastic surface, a ceramic surface, a painted surface, a coated surface, and combinations thereof. In a non-limiting embodiment, the metal surface may be or include steel, such as steel derived from iron, in a non-limiting example.

In a non-limiting embodiment, the foulant forming components may be or include metal carbonates, metal sulfates, metal oxides, metal phosphates, and combinations thereof. Alternatively, the foulant forming components may be or include a metal, such as but not limited to, magnesium, calcium, barium, strontium, radium, iron, manganese, zinc, lead, cations thereof, and combinations thereof. Metal phosphates may occur when phosphorous containing compounds, e.g. orthophosphate, and the metal are both present in a fluid and/or system. The retention of the respective salt constituents in ionic form, i.e. the solubility, depends upon such factors as water temperature, pH, ion concentration, and the like.

In a non-limiting embodiment, the protein(s) within the additive composition and/or fluid composition may be or include natural protein(s), recombinant protein(s), and combinations thereof. In a non-limiting embodiment, the protein(s) may include at least one chemical and/or biochemical modification, such as but not limited to at least one label, at least one linker, at least one tag, and combinations thereof.

The label may be or include, but is not limited to a radioactive isotope, a fluorophore, an enzymatic label useful in tracing the protein(s), and combinations thereof. The label or other modification may be useful in isolating the protein(s) from a specific bacterium and/or other expression system (E. coli as described below). The label or other modification may be used to identify the protein(s) once the fluid needs to be recovered, e.g. from a subterranean reservoir wellbore, refinery feed, and/or fluid composition.

A linker is a self-complementary oligomer that contains a recognition sequence for a particular restriction enzyme. The restriction enzyme may cleave the linker from the amino acid sequence and generate 'sticky ends' prior to cloning the protein(s). In a non-limiting embodiment, the linker may be hydrophobic or hydrophilic.

The tag may be or include, but is not limited to, an affinity tag, a solubilization tag, a chromatography tag, and combinations thereof. An affinity tag may be added to a protein for better purification of the protein from a biology source. Non-limiting examples of an affinity tag may be or include a chitin binding protein (CBP), a maltose binding protein (MBP), a glutathione-S-transferase (GST), a polyhistidine tag, and combinations thereof.

The polyhistidine tag (also known as a 'His-tag', hexahistidine tag, 6×His-tag, His6-tag, and the like) may be attached to a C-terminal end of the protein(s) in a non-limiting embodiment. A polyhistidine tag is an amino acid motif that may be attached to a protein(s), which has at least six histidine (His) residues. Polyhistadine-tags may be used for affinity purification of a polyhistidine-tagged recombinant protein(s) expressed in E. coli and/or other prokaryotic expression systems.

In a non-limiting embodiment, the polyhistidine-tag may enhance the ability of the protein(s) to prevent, inhibit, and/or decrease foulant formation and/or foulant deposition. Although the inventors do not wish to be bound to a particular theory, it is believed that the polyhistidine tag may have a strong affinity for divalent cations, so the p polyhistidine tag may chelate $Ba^{2+}$ or $Ca^{2+}$ in solution in a non-limiting embodiment. Additionally, the carboxyl chemistry on the surface of the protein(s) may chelate $Ba^{2+}$ or $Ca^{2+}$ in solution. Alternatively, because of the polyhistidine-tag's affinity for metal compounds, the polyhistidine tag may attach or cluster on solid surfaces (e.g. pipes), thereby attaching the protein(s) to the surfaces, to further reduce or prevent foulant formation and/or foulant deposition thereon.

In a non-limiting embodiment, the solubilization tag may be used to assist the proper folding of the protein when expressed in a chaperone-deficient species, such as E. coli. Non-limiting examples of solubilization tags may be or include, thioredoxin (TRX), poly(NANP), MBP, GST, and combinations thereof.

In a non-limiting embodiment, the chromatography tag may alter chromatographic properties of the protein for different resolutions during a particular separation technique. Such chromatography tags may be or include, but are not limited to polyanionic amino acids.

To obtain the natural and/or recombinant protein(s), such protein(s) may be purchased from a third party who specializes in isolating such protein(s) from a particular species and/or a third party who specializes in recombinant generation of such protein(s). In a non-limiting embodiment, a bacteria that includes the protein(s) may be plated on a growth medium, such as an agar, which is conducive to the growth of the bacteria. The protein(s) may be directly isolated from the bacteria to be added to or used for decreasing foulant formation and/or foulant deposition on a surface. 'Isolated' is defined herein to denote that the protein(s) has been removed from the intact cells or cellular debris, and is in a condition other than its native environment, is free of other extraneous or unwanted nucleic acids, proteases, and lipids, in a form suitable for use as a protein(s) as described herein.

In a non-limiting embodiment, the protein(s) may be inserted into or joined to a vector for insertion into a plasmid. A vector is a DNA molecule that may be used as a vehicle to artificially carry genetic material from a foreign cell and/or organism. A plasmid is defined as a circular extrachromosomal element found naturally in bacteria and some other organisms, which may be genetically engineered to clone DNA fragments. The plasmid may then be inserted into a host bacterium cell, such as Escherichia coli, where the host cell may replicate and/or express the foreign DNA. The E. coli cells may be plated on a growth medium, such as an agar, which is conducive to the growth of E. coli. The growth of E. coli propagates the protein(s) as clones within each E. coli cell. The protein(s) may be isolated from the E. coli cells and subsequently used as described herein. A non-limiting expression vector having the protein(s) may be a commercially available pGS21 expression vector, which is supplied by GenScript.

FIG. 4 represents a pGS21 plasmid for use as an expression vector for at least one recombinant protein(s). The plasmid is depicted as having a His tag, and a GST (Glutathione S Transferase) region, but such regions are optional for purposes of cloning/expressing the protein(s) described herein. The 'Ampicillin' region regulates the expression of β-lactamase; Ori is the DNA sequence that signals for the origin of replication (also known as 'origin'); lacI codes for the lactose repressor.

To isolate or obtain the protein(s) from E. coli, the E. coli cells may be harvested via centrifugation to produce a cell pellet. The cell pellet may be lysed either by physical means or by chemical means, such as detergents and/or enzymes (e.g. lysozyme) to produce a lysate. The raw lysate may contain the recombinant protein, as well as other proteins originating from the bacterial host. Thus, the raw lysate mixture may be incubated with an affinity resin having bound bivalent nickel and/or cobalt ions. The affinity resin may be sepharose/agarose functionalised with a chelator, such as but not limited to iminodiacetic acid (Ni-IDA), nitrilotriacetic acid (Ni-NTA), carboxylmethylaspartate (Co-CMA), and combinations thereof. The polyhistidine-tag may bind to the affinity resin with micromolar affinity. The affinity resin with the attached polyhistidine-tag(s) may then be washed with a phosphate buffer to remove the protein(s) that do not bind thereto, while the protein remains attached to the affinity resin via the polyhistidine tag. Thus, a polyhistidine tag allows the protein(s) to be purified in this manner. SDS-PAGE, Western blotting, and the like may be used to further assess the purity and amount of purified protein(s).

The protein(s) may be in a powder form and/or a liquid form (e.g. in solution) when added to or included in the fluid composition. The protein(s) may be part of an additive where the additive includes the protein(s), as well as other components to aid the protein(s) in decreasing foulant formation and/or foulant deposition.

The amount of the protein(s) within the additive composition may range from about 0.01 wt % independently to about 10 wt % as compared to a total base fluid, alternatively, from about 0.1 wt % independently to about 8 wt %, or from about 1 wt % independently to about 5 wt % in a non-limiting embodiment.

In a non-limiting embodiment, the additive composition and/or fluid composition may include at least one additional component in an amount ranging from about 1 ppm independently to about 10,000 ppm based on the total amount of the base fluid to be circulated at the same time or different time as the additive composition. Alternatively, the amount of the additional component(s) within the additive composition may range from about 100 ppm independently to about 5,000 ppm, or from about 1,000 ppm independently to about 4,000 ppm.

In a non-limiting embodiment, the base fluid and/or fluid composition may include foulant forming components in an amount ranging from about 10 ppm independently to about 50,000 ppm based on the total volume of the base fluid, alternatively from about 100 ppm independently to about 25,000 ppm, or from about 1000 ppm independently to about 10,000 ppm.

The additional component(s) may be or include, but are not limited to, at least one scale inhibitor, at least one corrosion inhibitor, surfactants, biocides, demulsifiers, and combinations thereof. Non-limiting embodiments of the scale inhibitor(s) may be or include, but are not limited to, polyacrylates, polymaleates, hydroxypropylacrylates, phosphonates, polyphosphonates, soy protein polymers (e.g. Pre-Cote 5000 from DUPONT), polysaccharide based inhibitors, polyaspartic acid based inhibitors, polymers thereof, copolymers thereof, and combinations thereof.

The additive composition may be added and/or included in a base fluid, such as but not limited to, an aqueous fluid, a non-aqueous fluid, an emulsified fluid, a non-emulsified fluid, and combinations thereof. In a non-limiting embodiment, the base fluid may be a drilling fluid, a completion fluid, a production fluid, a servicing fluid, an injection fluid, a refinery fluid, and combinations thereof to form a fluid composition. The pH of the base fluid, the additive composition, and/or the fluid composition may be greater than about 3, alternatively from about 3 independently to about 9, or from about 5 independently to about 7 in another non-limiting embodiment.

Moreover, the additive composition may contact a surface at the same time or different time as the base fluid, i.e. the additive composition may contact the surface before, during, and/or after the base fluid. In a non-limiting embodiment, the surface may be located in a downhole subterranean reservoir wellbore, a refinery, and combinations thereof. Said differently, the additive composition may be circulated into the location that includes the surface, such as a downhole subterranean reservoir wellbore, a refinery, and combinations thereof before, during, and/or after the base fluid is circulated therein in a non-limiting embodiment.

In a non-limiting embodiment, the temperature of the additive composition and/or fluid composition and/or location of the surface may range from about 25° C. independently to about 200° C., alternatively from about 70 C independently to about 175° C., or from about 100 C independently to about 150° C. in another non-limiting embodiment.

The contacting of the additive composition with the surface(s) may suppress or decrease the amount of and/or the rate of foulant formation and/or foulant deposition to the surface(s). That is, it is not necessary for foulant formation and/or foulant deposition to be entirely prevented for the methods and compositions discussed herein to be considered effective, although complete prevention is a desirable goal. Success is obtained if less foulant formation and/or foulant deposition occurs in the presence of the protein(s) than in the absence of the protein(s). Alternatively, the methods and fluid compositions described are considered successful if there is at least a 50% decrease in foulant deposition and/or foulant formation on the targeted surfaces, such as within a subterranean wellbore and/or within a refinery.

Determination of the induction time for foulant formation and/or foulant deposition in the presence or absence of the protein(s) may be used as an assay for the inhibition activity of the protein(s). Induction time may be the time required for the onset point of the foulant formation and/or foulant deposition. The effect of a number of parameters including concentration of the protein(s), temperature, gas, and salt are determined and data subject to statistical analysis.

The growth rate of formed foulant(s) (e.g. precipitated foulants) in the presence of the protein(s) may also be determined and compared to activities of other protein(s) and/or known inhibitors for a particular type of foulant. Effects of concentration of the protein(s), temperature, gas, and salt on the growth rate may also be examined.

'Feed' is defined herein to be a subterranean feed and/or a refinery feed that includes a fluid and any components therein (e.g. pipes or conduits where the base fluid may flow through or alongside).

Circulating a base fluid and/or an additive composition into a subterranean reservoir wellbore and/or refinery may occur by injecting the base fluid and/or the additive composition thereinto. The additive composition comprising the protein(s) may be circulated into the subterranean reservoir wellbore and/or refinery feed at the same time or different time as the base fluid (i.e. before, during, or after the base fluid). In the instance the protein(s) are circulated into the subterranean reservoir wellbore and/or refinery at the same time as the base fluid, the protein(s) may be added to the base fluid prior to the circulation of the fluid composition into the subterranean reservoir wellbore or refinery in a non-limiting instance.

A drilling operation is used to drill into a subterranean reservoir formation, and a drilling fluid accompanies the drilling operation. A completions operation is performed to complete a well, such as the events and assembly of equipment (e.g. downhole tubulars) to bring a well into production once the drilling operations are done. A stimulation operation is one where a treatment is performed to restore or enhance the productivity of a well, such as hydraulic fracturing (above the fracture pressure of the reservoir formation) and matrix treatments (below the fracture pressure of the reservoir formation). An injection operation includes a well where fluids are injected into the well, instead of produced therefrom, to maintain reservoir pressure therein. A servicing operation allows for maintenance to the well during and/or after the well has been completed and/or produced, enhancing the well productivity, and/or monitoring the performance of the well or reservoir.

Each downhole operation has its own respective downhole fluid, e.g. downhole operations utilize drilling fluids. Downhole fluids are typically classified according to their base fluid. In aqueous based fluids, solid particles are suspended in a continuous phase consisting of water or brine. Oil can be emulsified in the water, which is the continuous phase. "Aqueous based fluid" is used herein to include fluids having an aqueous continuous phase can be all water, brine, seawater, and combinations thereof; an oil-in-water emulsion, or an oil-in-brine emulsion; and combinations thereof. For example, brine-based fluids are aqueous based fluids, in which the aqueous component is brine. 'Brine' is defined as a water-based fluid comprising salts that have been controllably added thereto. 'Seawater' is similar to brine, but the salts in the seawater have been disposed therein by a natural process, e.g. ocean water is a type of seawater that formed in the absence of any man-made intervention.

Non-aqueous base fluids are the opposite or inverse of aqueous-based fluids. "Non-aqueous fluid" is used herein to include fluids having a non-aqueous continuous phase where the non-aqueous continuous phase is all oil, a non-aqueous fluid, a water-in-oil emulsion, a water-in-non-aqueous emulsion, a brine-in-oil emulsion, a brine-in-non-aqueous emulsion, a seawater-in-non-aqueous emulsion. In non-aqueous-based fluids, solid particles are suspended in a continuous phase consisting of oil or another non-aqueous fluid. Water or brine can be emulsified in the oil; therefore, the oil is the continuous phase. In oil-based fluids, the oil may consist of any oil or water-immiscible fluid that may include, but is not limited to, diesel, mineral oil, esters, refinery cuts and blends, or alpha-olefins. Non-aqueous-based fluid as defined herein may also include synthetic-based fluids or muds (SBMs), which are synthetically produced rather than refined from naturally-occurring materials. Synthetic-based fluids often include, but are not necessarily limited to, olefin oligomers of ethylene, esters made from vegetable fatty acids and alcohols, ethers and polyethers made from alcohols and polyalcohols, paraffinic, or aromatic, hydrocarbons alkyl benzenes, terpenes and other natural products and mixtures of these types.

In the foregoing specification, the invention has been described with reference to specific embodiments thereof, and has been described as effective in providing additive compositions, fluid compositions, and methods for decreasing foulant formation and/or foulant deposition on at least one surface in contact with at least one protein. However, it will be evident that various modifications and changes can be made thereto without departing from the broader spirit or scope of the invention as set forth in the appended claims. Accordingly, the specification is to be regarded in an illustrative rather than a restrictive sense. For example, specific base fluids, surfaces, proteins, scale forming components, corrosion forming components, corrosion inhibitors, and scale inhibitors falling within the claimed parameters, but not specifically identified or tried in a particular composition or method, are expected to be within the scope of this invention.

The present invention may suitably comprise, consist or consist essentially of the elements disclosed and may be practiced in the absence of an element not disclosed. For instance, the additive composition for a base fluid, such as but not limited to, a drilling fluid, a completion fluid, a production fluid, a servicing fluid, an injection fluid, a refinery fluid, and combinations thereof may consist of or consist essentially of at least one protein, such as but not limited to, at least one aspein protein, at least one aspolin protein, at least one dentine protein, at least one DRICH-1 protein, at least one nacrein protein, at least one SMDT-1 protein, derivatives thereof, fragments thereof, mimetics thereof, and combinations thereof.

The fluid composition may consist of or consist essentially of a base fluid, at least one protein, and at least one foulant forming component where less foulant formation occurs in the presence of the at least one protein as compared to an otherwise identical fluid composition absent the at least one protein. The base fluid may be or include, but is not limited to, aqueous-based fluids, non-aqueous-based fluids, emulsified fluids, non-emulsified fluids, and combinations thereof. The protein(s) may be or include, but is not limited to at least one aspein protein, at least one aspolin protein, at least one dentine protein, at least one DRICH-1 protein, at least one nacrein protein, an SMDT-1 protein, derivatives thereof, fragments thereof, mimetics thereof, and combinations thereof.

The method may consist of or consist essentially of contacting at least one surface with at least one protein, and decreasing an amount of foulant deposition onto the surface as compared to an otherwise identical surface absent the contact of the surface with the at least one protein. The protein(s) may be or include, but are not limited to, at least one aspein protein, at least one aspolin protein, at least one dentine protein, at least one DRICH-1 protein, at least one nacrein protein, at least one SMDT-1 protein, derivatives thereof, fragments thereof, mimetics thereof, and combinations thereof.

The words "comprising" and "comprises" as used throughout the claims, are to be interpreted to mean "including but not limited to" and "includes but not limited to", respectively.

The invention claimed is:

1. A method comprising:
contacting at least one surface with at least one protein selected from the group consisting of at least one aspein protein, at least one aspolin protein, at least one dentine protein, at least one DRICH-1 protein, at least one nacrein protein, at least one SMDT-1 protein, derivatives thereof, fragments thereof, mimetics thereof, and combinations thereof; and
decreasing an amount of foulant deposition onto the at least one surface as compared to an otherwise identical surface absent the contact of the at least one surface with the at least one protein, where the foulant comprises at least one member selected from the group consisting of metal carbonates, metal sulfates, metal oxides, and combinations thereof, and where the metal is selected from the group consisting of magnesium, calcium, barium, strontium, radium, iron, manganese, zinc, lead, cations thereof, and combinations thereof.

2. The method of claim 1, wherein the at least one protein is selected from the group consisting of at least one aspein protein and at least one aspolin protein, further wherein:
the at least one aspein protein comprises an amino acid sequence that is at least 75% homologous to the amino acid sequence of SEQ ID NO:1;
the at least one aspolin protein comprises an amino acid sequence that is at least 75% homologous to the amino acid SEQ ID:2, the amino acid SEQ ID:3, and combinations thereof; and
combinations thereof.

3. The method of claim 1, further comprising contacting the at least one surface with a base fluid before, during, or after contacting the at least one surface with the at least one protein.

4. The method of claim 3, wherein the fluid comprises foulant forming components in an amount ranging from about 10 ppm to about 50,000 ppm based on the total volume of the fluid before contacting the surface with the fluid.

5. The method of claim 1 wherein the at least one surface is at a location selected from the group consisting of a subterranean reservoir wellbore, a refinery feed, and combinations thereof.

6. The method of claim 3, wherein the base fluid is selected from the group consisting of aqueous-based fluids, non-aqueous-based fluids, emulsified fluids, non-emulsified fluids, and combinations thereof.

7. The method of claim 1, wherein the at least one protein is selected from the group consisting of natural proteins, recombinant proteins, and combinations thereof.

8. The method of claim 1, wherein the at least one protein comprises at least one modification selected from the group consisting of a linker, a label, a tag, and combinations thereof.

9. The method of claim 1, wherein the method is practiced at a temperature ranging from about 25° C. to about 200° C.

10. A method comprising:
contacting at least one surface with at least one protein, wherein the at least one protein is selected from the group consisting of at least one aspein protein and at least one aspolin protein, further wherein:
the at least one aspein protein comprises an amino acid sequence that is at least 75% homologous to the amino acid sequence of SEQ ID NO:1;
the at least one aspolin protein comprises an amino acid sequence that is at least 75% homologous to the amino acid SEQ ID:2, the amino acid SEQ ID:3, and combinations thereof; and combinations thereof;

decreasing an amount of foulant deposition onto the at least one surface as compared to an otherwise identical surface absent the contact of the at least one surface with the at least one protein, where the foulant comprises at least one member selected from the group consisting of metal carbonates, metal sulfates, metal oxides, and combinations thereof, and where the metal is selected from the group consisting of magnesium, calcium, barium, strontium, radium, iron, manganese, zinc, lead, cations thereof, and combinations thereof; and contacting the at least one surface with a base fluid before, during, or after contacting the at least one surface with the at least one protein, wherein the base fluid is selected from the group consisting of aqueous-based fluids, non-aqueous-based fluids, emulsified fluids, non-emulsified fluids, and combinations thereof.

11. The method of claim 10, wherein the base fluid comprises foulant forming components in an amount ranging from about 10 ppm to about 50,000 ppm based on the total volume of the base fluid before contacting the surface with the fluid.

12. The method of claim 10 wherein the at least one surface is at a location selected from the group consisting of a subterranean reservoir wellbore, a refinery feed, and combinations thereof.

13. The method of claim 10, wherein the at least one protein comprises at least one modification selected from the group consisting of a linker, a label, a tag, and combinations thereof.

14. The method of claim 10, wherein the method is practiced at a temperature ranging from about 25° C. to about 200° C.

15. A method comprising:

contacting at least one surface with at least one protein selected from the group consisting of at least one aspein protein, at least one aspolin protein, at least one dentine protein, at least one DRICH-1 protein, at least one nacrein protein, at least one SMDT-1 protein, derivatives thereof, fragments thereof, mimetics thereof, and combinations thereof;

decreasing an amount of foulant deposition onto the at least one surface as compared to an otherwise identical surface absent the contact of the at least one surface with the at least one protein, wherein the foulant comprises at least one member selected from the group consisting of metal carbonates, metal sulfates, metal oxides, and combinations thereof, where the metal is selected from the group consisting of magnesium, calcium, barium, strontium, radium, iron, manganese, zinc, lead, cations thereof, and combinations thereof; and contacting the at least one surface with a base fluid before, during, or after contacting the at least one surface with the at least one protein.

16. The method of claim 15, wherein the at least one protein is selected from the group consisting of at least one aspein protein and at least one aspolin protein, further wherein:

the at least one aspein protein comprises an amino acid sequence that is at least 75% homologous to the amino acid sequence of SEQ ID NO:1;

the at least one aspolin protein comprises an amino acid sequence that is at least 75% homologous to the amino acid SEQ ID:2, the amino acid SEQ ID:3, and combinations thereof; and combinations thereof.

17. The method of claim 15, wherein the base fluid comprises foulant forming components in an amount ranging from about 10 ppm to about 50,000 ppm based on the total volume of the fluid before contacting the surface with the fluid.

18. The method of claim 15, wherein the method is practiced at a temperature ranging from about 25° C. to about 200° C.

* * * * *

SEQUENCE LISTING

```
<160> NUMBER OF SEQ ID NOS: 2

<210> SEQ ID NO 1
<211> LENGTH: 228
<212> TYPE: PRT
<213> ORGANISM: WallEye Pollack

<400> SEQUENCE: 1

Met Ala Ser Tyr Lys Thr Trp Leu Leu Gly Leu Leu Val Ala Leu Leu
1               5                   10                  15
```

```
Cys Ser Phe Gln Thr Pro Leu Ala Pro Gly Val Lys Ala Gln Asp Leu
         20                  25                  30

Pro Phe Val Gln Glu Glu Gly Leu Val Ala Asp Asp Asp Asp Asp
         35                  40                  45

Asp Asp Asp Ala Gly Asp Asp Asp Asp Asp Asp Asp Asp Asp
 50                  55                  60

Asp Asp Asp Asp Asp Asp Asp Asp Asp Asp Asp Asp Asp Asp Asp Asp
 65                  70                  75                  80

Glu Asp Asp Asp Asp Asp Asp Asp Asp Asp Asp Asp Asp Asp
                 85                  90                  95

Asp Asp Asp Asp Asp Asp Asp Asp Asp Asp Asp Asp Asp Asp
                100                 105                 110

Asp Asp Asp Asp Asp Asp Asp Asp Asp Asp Asp Asp Asp Asp
            115                 120                 125

Asp Asp Asp Asp Asp Asp Asp Asp Asp Asp Asp Asp Asp Asp
            130                 135                 140

Asp Asp Asp Asp Asp Asp Asp Asp Asp Asp Asp Asp Asp Asp Asp Asp
145                 150                 155                 160

Asp Asp Asp Asp Asp Asp Asp Asp Asp Asp Asp Asp Asp Asp
                165                 170                 175

Asp Asp Asp Asp Asp Asp Asp Asp Asp Asp Asp Asp Asp Asp
                180                 185                 190

Asp Asp Asp Asp Asp Asp Asp Asp Asp Asp Asp Asp Asp Asp
            195                 200                 205

Asp Asp Asp Asp Asp Asp Asp Asp Asp Asp Asp Asp Asp Asp
210                 215                 220

His Glu Glu Leu
225

<210> SEQ ID NO 2
<211> LENGTH: 347
<212> TYPE: PRT
<213> ORGANISM: WallEye Pollack

<400> SEQUENCE: 2

Met Ala Ser Tyr Lys Thr Trp Leu Leu Gly Leu Leu Val Ala Leu Leu
 1               5                  10                  15

Cys Ser Phe Gln Thr Pro Leu Ala Pro Gly Val Lys Ala Gln Asp Leu
                20                  25                  30

Pro Phe Val Gln Glu Glu Gly Leu Val Ala Asp Asp Asp Asp Asp
            35                  40                  45

Asp Asp Asp Ala Gly Asp Asp Asp Asp Asp Asp Asp Asp Asp
 50                  55                  60

Asp Asp Asp Asp Asp Asp Asp Asp Asp Asp Asp Asp Asp Asp Asp Asp
 65                  70                  75                  80

Glu Asp Asp Asp Asp Asp Asp Asp Asp Asp Asp Asp Asp Asp
                 85                  90                  95

Asp Asp Asp Asp Asp Asp Asp Asp Asp Asp Asp Asp Asp Asp
                100                 105                 110

Asp Asp Asp Asp Asp Asp Asp Asp Asp Asp Asp Asp Asp Asp
            115                 120                 125

Asp Asp Asp Asp Asp Asp Asp Asp Asp Asp Asp Asp Asp Asp
            130                 135                 140

Asp Asp Asp Asp Asp Asp Asp Asp Asp Asp Asp Asp Asp Asp Asp Asp
```

-continued

```
145                 150                 155                 160
Asp Asp Asp Asp Asp Asp Asp Asp Asp Asp Asp Asp Asp Asp Asp Asp
                165                 170                 175
Asp Asp Asp Asp Asp Asp Asp Asp Asp Asp Asp Asp Asp Asp Asp Asp
                180                 185                 190
Asp Asp Asp Asp Asp Asp Asp Asp Asp Asp Asp Asp Asp Asp Asp Asp
                195                 200                 205
Asp Asp Asp Asp Asp Asp Asp Asp Asp Asp Asp Asp Asp Asp Asp Asp
        210                 215                 220
His Glu Ala Gly Asp Asp Asp Asp Asp Asp Asp Asp Asp Asp Asp Asp
225                 230                 235                 240
Asp Asp Asp Asp Asp Asp Asp Asp Asp Asp Asp Asp Asp Asp Asp Asp
                245                 250                 255
Asp Asp Asp Asp Asp Asp Asp Asp Asp Asp Ser Thr Tyr His Lys
                260                 265                 270
Gly Ser Val Cys Ala Tyr Cys Glu Phe Cys Glu His Cys Asp Gly Cys
            275                 280                 285
Asp Lys Cys Pro Cys Glu Glu Gly Asp Thr Ser Glu His Cys Asp Asp
        290                 295                 300
Cys Lys Met Cys Asn Phe Cys His Val Cys Pro Met Cys Lys Thr Leu
305                 310                 315                 320
Cys Thr Pro Gly Gly Phe Leu Asp Glu Phe Thr Gly Ser Ile Tyr Lys
                325                 330                 335
Thr Val Ala Asp Val Phe Asp Asp Glu Lys Lys
                340                 345
```